United States Patent [19]

Falk

[11] 4,152,897
[45] May 8, 1979

[54] TANDEM BRAKE MASTER CYLINDER

[75] Inventor: Edward J. Falk, St. Louis County, Mo.

[73] Assignee: Wagner Electric Corporation, St. Louis, Mo.

[21] Appl. No.: 913,521

[22] Filed: Jun. 7, 1978

Related U.S. Application Data

[63] Continuation of Ser. No. 667,427, Mar. 16, 1976, abandoned.

[51] Int. Cl.² .......................................... B60T 11/20
[52] U.S. Cl. ...................................... 60/562; 60/589; 60/592; 251/325
[58] Field of Search ................ 60/562, 585, 588, 589, 60/592; 251/245, 246, 325; 137/854

[56] References Cited

U.S. PATENT DOCUMENTS

| | | | |
|---|---|---|---|
| 2,000,187 | 5/1935 | Oliver | 60/589 |
| 2,657,537 | 11/1953 | Oakley | 60/589 |
| 3,818,706 | 6/1974 | Gaiser | 60/562 |

FOREIGN PATENT DOCUMENTS

| | | | |
|---|---|---|---|
| 552598 | 6/1932 | Fed. Rep. of Germany | 251/325 |
| 1039044 | 6/1951 | France | 60/585 |

Primary Examiner—Martin P. Schwadron
Assistant Examiner—Abraham Hershkovitz
Attorney, Agent, or Firm—Eyre, Mann, Lucas & Just

[57] ABSTRACT

A brake master cylinder contains a primary and a secondary piston each having an associated brake fluid reservoir and compensator valve. Normally, the primary piston is actuated directly by mechanical force and the secondary piston is actuated by fluid pressure acting on it from the primary cylinder. If brake fluid pressure fails in either primary or secondary piston regions, the unfailed piston thereupon responds directly to mechanical actuating forces to produce normal brake fluid pressure in its associated wheel cylinders without interference from the failed piston.

Compensator valves, external to the cylinders enable brake fluid replenishment without requiring additional cylinder length.

2 Claims, 8 Drawing Figures

TANDEM BRAKE MASTER CYLINDER

This is a continuation of application Ser. No. 667.427 filed Mar. 16, 1976, now abandoned.

BACKGROUND OF THE INVENTION

The modern brake master cylinder practice of placing primary and secondary pistons in tandem in a single master cylinder tends to increase the length and weight of the brake master cylinder. Increasing size and weight of accessories runs counter to the desire for smaller and lighter vehicles. In addition, in large vehicles such as trucks, the mass becomes too great to support in the usual cantilever fashion. The additional support bracket required further increases vehicle weight. One way of reducing length and consequent weight consists of removing the compensating valves, normally found in the brake master cylinder, to a location outside the cylinder. U.S. Pat. No. 3,818,706 and 3,879,947 both in the name of Robert F. Gaiser show compensating valves so located. The disclosed compensator valves are a type which are subject to blockage with dirt in the hydraulic fluid reservoir. Dirt blockage of the compensator valve is most serious when the valve is held partly open. An open compensator valve allows brake cylinder pressure to by bypassed into the brake fluid reservoir rather than going to the brake lines. Such loss of fluid pressure occasions brake failure.

The prior art fails to teach a brake master cylinder with self-cleaning compensator valve located remotely from the master cylinder.

SUMMARY OF THE INVENTION

The instant invention teaches a dual piston master cylinder in which the compensator valve for each piston is located outside the master cylinder bore. The compensator valves are of the flexible-lip type which allow solid contaminants in the brake fluid to be drawn past the flexible lips without the valves becoming stuck open or blocked.

The single cylinder bore of a hydraulic master cylinder contains primary and secondary pistons, each piston supplying hydraulic pressure to an independent brake system. The primary piston is actuated directly by pushrod force from the brake pedal. The secondary piston is normally actuated by hydraulic pressure on its back side provided by the primary piston. In case loss of pressure in either brake system causes one of the brake pistons to become ineffective, the other brake piston is enabled to continue functioning. If the primary brake system loses pressure, the primary piston moves forward to bear mechanically upon the back of the secondary piston thereby transmitting normal pushrod forces to the secondary piston to enable continued secondary brake system functioning. If the secondary brake system loses pressure, the secondary piston is forced to the end of its travel by brake actuation thereby enabling the primary piston to generate pressure within its portion of the bore.

Compensating valves for each piston are located outside the piston bore to reduce the overall length and weight of the master cylinder.

DETAILED DESCRIPTION OF THE PREFERRED EMBODIMENT

Figure 1:
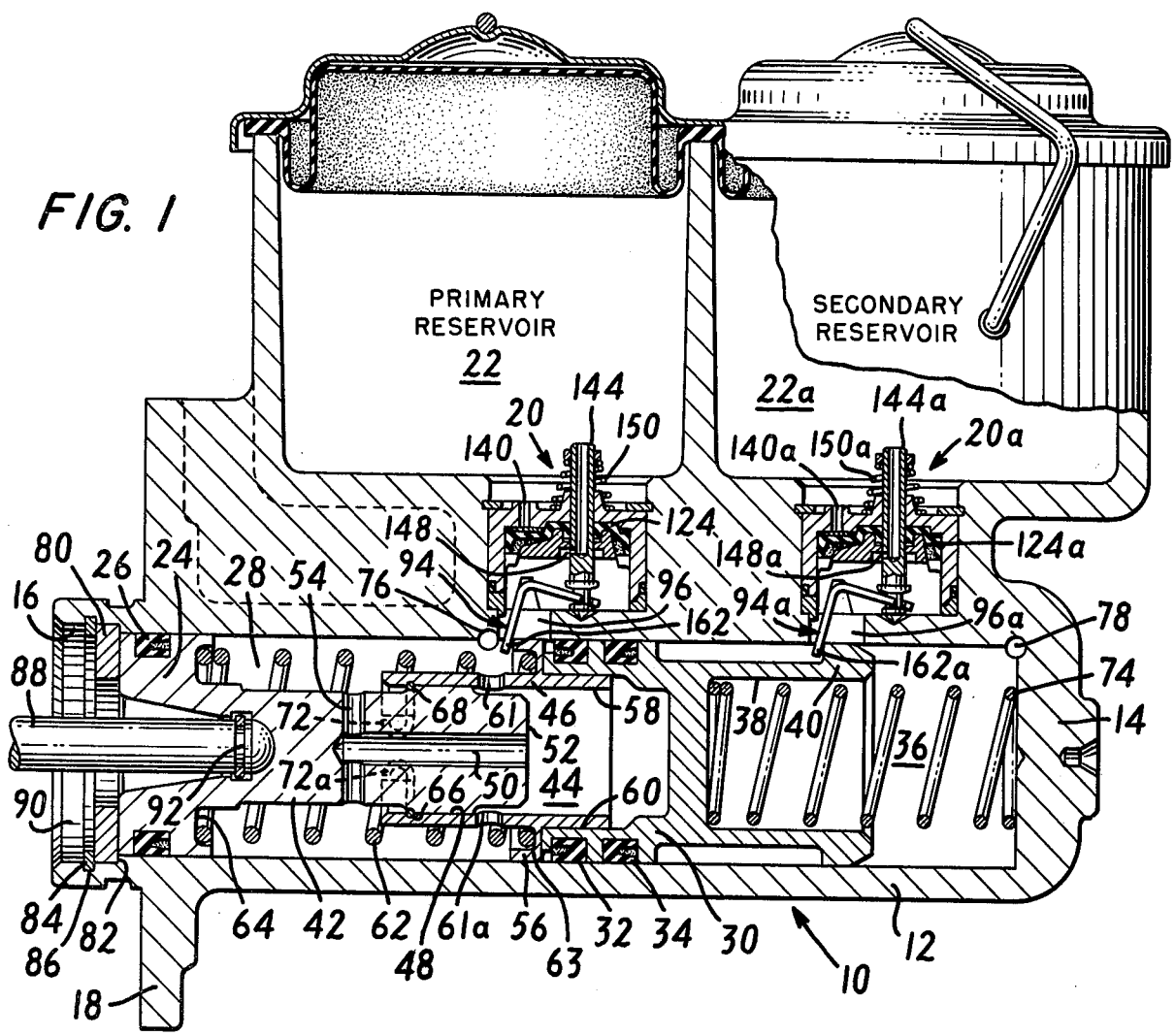
FIG. 1 shows a cross-sectional view of an embodiment of the invention taken through the axis of the master cylinder.

An embodiment of the tandem master cylinder comprising the subject matter of this invention is shown in FIG. 1. The master cylinder, shown generally at 10, consists of a cylindrical part 12 having a closed end 14 and an open end 16, a mounting flange 18, primary and secondary compensator valves 20, 20a, and primary and secondary brake fluid reservoirs 22, 22a.

A primary piston 24 having annular seal 26 defines one end of a primary cylinder 28. A secondary piston 30 is located between the primary piston 24 and the closed end 14 of the cylindrical part 12. A first annular seal 32 on the end of the secondary piston 30 nearest the primary piston 24 defines the inner end of the primary cylinder 28. A second annular seal 34 at the end of the secondary piston 30 nearest the closed end 14 defines the outboard end of a secondary cylinder 36.

A cylindrical extension 38 on the secondary piston 30 ends in an annular guide flange 40. The guide flange 40 is slideably engaged with the walls of the cylindrical part 12. The correct axial positioning of the secondary piston 30, maintained by the guide flange 40, avoids cocking of the secondary piston 30 in the cylindrical part 12 and resultant buffing and wear.

A guide rod 42, connected to the primary piston 24, extends through the primary cylinder 28 and into a cylindrical cavity 44 in a cylindrical guide sleeve 46. The guide rod 42 has a cylindrical enlarged section 48 adapted to slideable guiding fit within the cylindrical cavity 44. The guide rod 42 has an axial hole 50 extending from its inner end 52 to a transverse hole 54 whereby a continuous channel for fluid is created from the cylindrical cavity 44 through the axial hole 50 and out the transverse hole 54 into the primary cylinder 28. The guide sleeve 46 has an annular guide flange 56 about its circumference in slideable engagement with the wall of the cylinder. The annular guide flange 56 and guide sleeve 46, together with the engagement of the guide sleeve 46 with the guide rod 42, maintains the correct axial positioning of the primary piston 24 to prevent buffing and wear. A cylindrical sleeve extension 58 of the cylindrical guide sleeve 46 fits within a cylindrical cavity 60 within the outer end of the secondary piston 30.

A plurality of air-bleeder holes 61, 61a prevent the trapping of air bubbles within the cylindrical cavity 44.

The annular guide flange 56 contains an annular groove 63 in its side which faces the primary piston 24. One end of a primary piston helical return spring 62 fits into the annular groove 63. The other end of the primary piston return spring 62 fits into an annular groove 64 in the inner surface of the primary piston 24.

An annular groove 66 is located inside the cylindrical guide sleeve 46 near its outer end. A stop ring 68 is biased outward by its own resilience to fit within the annular groove 66. With the stop ring 68 in place, the cylindrical enlarged section 48 of the guide rod 42 is unable to pass. Thus the guide rod 42 is retained within the guide sleeve 46. Two hook-shaped members 72, 72a on the ends of the stop ring 68 provide means for compressing the stop ring 68 to enable its withdrawal for assembly and dissassembly of the guide rod 42 and the guide sleeve 46.

A helical secondary-piston return spring 74 applies axial spring force between the secondary piston 30 and the closed end 14 of the cylindrical part 12. The spring force of the secondary-piston return spring 74 is less than the spring force of the primary piston return spring 62 as indicated in the drawing by the relative wire diameters of the two springs.

A primary cylinder outlet port 76 provides a connection from the primary cylinder 28 to the primary brake system. Similarly, a secondary cylinder outlet port 78 provides a connection from the secondary cylinder 36 to the secondary brake system. The two outlet ports 76, 78 are each as high as possible in the cylindrical part 12 in order to enhance the discharge of air during bleeding.

The open end 16 of the cylindrical part 12 is blocked by a piston stop ring 80 which bears against a lip 82 at its inner perimeter. The piston stop ring 80 is retained in position by an expansion ring 84 which fits into a groove 86 near the open end 16. Mechanical forces are connected by a pushrod 88 through the hole 90 in the piston stop ring 80 to a socket 92 in the outer side of the primary piston 24.

Compensator actuating levers 94 and 94a protrude through fluid channels 96 and 96a partway into the primary and secondary cylinders 28 and 36, all respectively. In their rest positions shown in FIG. 1, the left edges of the guide flanges 56 and 40 bear against the primary and secondary compensator actuating levers 94 and 94a respectively.

Figure 2:
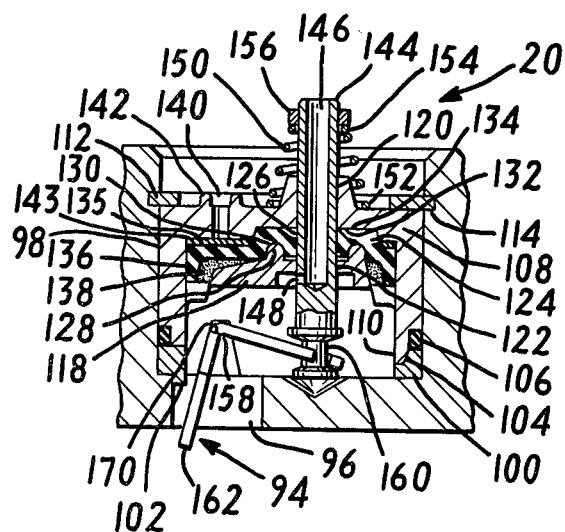
FIG. 2 shows an enlarged cross-sectional view of the compensator valve of the embodiment in FIG. 1.

The primary and secondary compensator valves 20 and 20a are identical, thus only the primary compensator valve 20 will be described in detail. The enlarged view of the primary compensator valve 20 shown in FIG. 2 is referred to in the following description.

The compensator valve 20 is situated in a cylindrical cavity 98 in the master cylinder body 12. The cylindrical cavity 98 is located at the bottom of the primary reservoir 22 (see FIG. 1). The fluid channel 96 provides fluid communication between the bottom of the cylindrical cavity 98 and the top of the primary cylinder 28.

The axis of the fluid channel 96 is eccentric with respect to the axis of the cylindrical cavity 98, being closer to one side of the cylindrical cavity 98.

A base ring 100 of a compensator cup filler and lever retainer 118 rests in the bottom of the cylindrical cavity 98. A finger projection 102 from the base ring 100 partially enters the fluid channel 96 to provide a rotational reference to the base ring 100. A locating notch 104 is located in the top of the base ring 100 at the side of the base ring 100 opposite the finger projection 102. A resilient gasket 106 prevents direct leakage of brake fluid from the reservoir 22 past the side of the base ring 100.

A compensator housing 108 is located above base ring 100. A locating lub 110 projecting from the bottom of the compensator housing 108 engages the locating notch 104 in the base ring 100. The engagement of the locating lub 110 in the locating notch provides a rotational reference to the compensator housing 108. The compensator housing 108 is retained in the cylindrical cavity 98 by an expansion ring 112 which engages an annular groove 114 in the cylindrical cavity 98.

The non-resilient compensator cup filler and lever retainer 118 is located in the center of the compensator housing 108. A compensator stem guide hole 120 is eccentrically located in the top of the compensator housing 108. A coaxial matching guide hole 122 is located in the top of the compensator cup filler and lever retainer 118. A resilient compensator cup 124 is retained between the top of the compensator cup filler and lever retainer 118 and the underside of the compensator housing 108. The compensator cup contains a hole 126 which is coaxial with the guide holes 120 and 122. A circular ridge 128, concentric with the matching guide hole 122 in the top of the compensator cup filler and lever retainer 118, fits into a matching circular groove 130 in the underside of the compensator cup 124. The circular groove 130 holds a flat top portion 132 against a matching flat portion 134 on the underside of the compensator housing 108. Outside the circular ridge 128, the compensator cup filler and lever retainer 118 fails to bear against the resilient compensator cup 124, but instead, the compensator cup 124 is held in contact with the underside of the compensator housing 108 by the negligible force of the resilient material of which the compensator cup 124 is fabricated. The unsupported portion of the compensator cup 124 forms a flexible valve surface 135 in contact with the bottom of the compensator housing 108. The eccentricity of the compensator cup 124 causes one side of the flexible valve surface 135 (the left side in the cross sectional drawing) to be longer, and consequently more flexible, than the other side.

Figure 3:
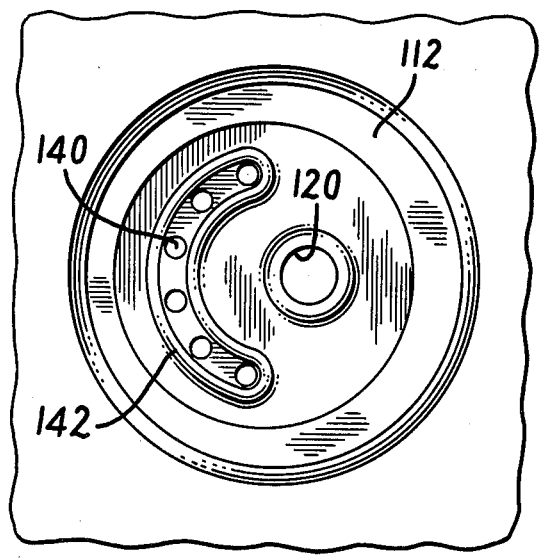
FIG. 3 shows a top view of the fluid inlet holes to the compensator valve.

The flexible valve surface 135 covers and seals a plurality of fluid entry holes 140, one of which is shown in the cross-sectional view. Referring momentarily to the top view of the compensator housing 108 shown in FIG. 3, it is seen that there exist six fluid-entry holes 140 spaced at 30-degree angles on an arc centered on the compensator stem guide hole 120. Returning again to FIG. 2, it is seen that a ridge 142 about the entry hole 140 is provided to discourage any sediment resting on the upper surface of the compensator housing 108 from entering the fluid entry holes 140. A space 138 exist below the unsupported area of compensator cup 124 into which the flexible material of the compensator cup 124 may be deflected as will be described. A non-resilient disc 143 prevents pressure extrusion of the resilient material of the circular lip 136 through fluid entry holes 140.

A compensator stem 144, having an axial blind hole 146 and a port hole 148, is disposed in the two guide holes 120 and 122. A conical spiral spring 150 bearing at its bottom 152 against the compensator housing 108, and at its top 154 against a spring retainer 156 provides an upward force on the compensator stem 144.

The compensator actuating lever 94, passing through the fluid channel 96, makes a right-angle bend 158 before it is hingeably attached to a groove 160 at the lower end of the compensator stem 144.

Figure 4:
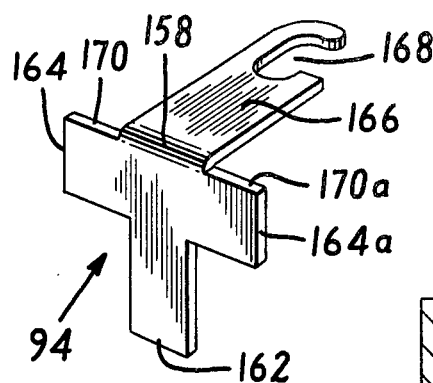
FIG. 4 shows a three-quarter view of a compensator actuating lever.

Referring momentarily to the three-quarter view of the compensator actuating lever shown in FIG. 4, the actuating finger 162, which extends through the fluid channel 96, is connected to a pair of wings 164, 164a and thence to an actuating member 166 having a slot 168 adapted to hingeable engagement with the groove 160 in the lower end of the compensator stem 144 (see FIG. 2). The upper edges 170, 170a of the wings 164, 164a are adapted to bearing against the top of a regular trapezoid 170 within the compensator cup filler and lever retainer 118 seen in FIG. 2.

Returning to FIG. 2, in the condition shown, the actuating finger 162 is biased fully to the left by the leftward pressure of the edge of the annular guide flange 56 (see FIG. 1). The compensator actuating lever 94 holds the compensator stem 144 in its fully downward position shown. The axial blind hole 146, port hole 148, and fluid channel 96 provide fluid communication between the primary reservoir 22 and the primary cylinder 28 (see FIG. 1) to relieve excess fluid pressure in the primary cylinder 28 at the conclusion of a brake actuation.

OPERATION

The following description of operation is with reference to FIGS. 1 and 2 as appropriate.

Figure 5:
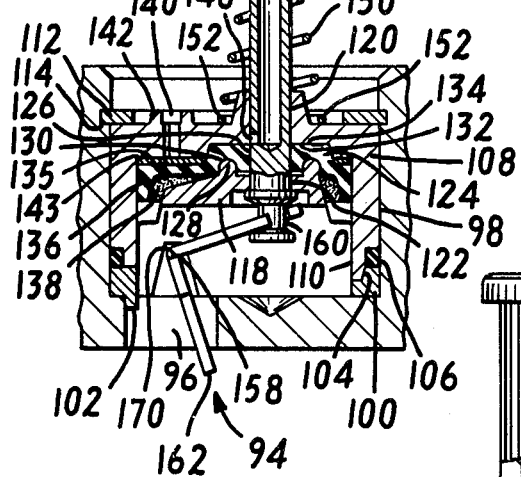
FIG. 5 shows a cross-sectional view of a compensator valve in the closed position.

When brake actuation causes the pushrod 88 to apply force to the socket 92, initially the primary piston 24 and secondary piston 30 begin to move together because of the greater spring force of the primary piston return spring 62 as compared to the secondary piston return spring 74. Immediately the cylindrical guide sleeve 46 and secondary piston 30 begin to move, the lateral pressure previously exerted on the compensator actuating levers 94 and 94a by the edges of the two guide flanges 56 and 40 is released. With the down pressure on the compensator stems 144, 144a released, the compensator stems 144, 144a are forced upward by the pressure of their respective conical spiral springs 150, 150a. The port holes 148, 148a are thereby carried upward until they are above the resilient material of their compensator cups 124, 124a. The condition of the primary compensator valve 20 when the actuating lever 94 is fully released is shown in FIG. 5. The port hole 148 is drawn completely through the resilient compensator cup 124. Fluid communication from the port hole 148 and the fluid channel 96 is sealed off by the resilient material of the compensator cup 124. As pressure builds up in the primary master cylinder 28, the resilient compensator cup 124 seals the fluid entry holes 140 to prevent release of brake pressure into the reservoir 22.

Referring again to FIG. 1, as the primary and secondary pistons 24 and 30 continue to travel into their respective cylinders, 28 and 36 respectively, the relative forces on the secondary piston 30 assume a balance between the opposing fluid pressure in primary and secondary cylinders 28 and 30 and the opposing spring forces of the two piston return springs 62 and 74. The fluid pressure balance rapidly dominates due to the much larger forces involved. As the fluid pressure develops, it is connected to primary and secondary brake systems through the primary and secondary cylinder outlet ports 76 and 78 respectively.

When the brake pedal is released, the primary and secondary pistons 28 and 30 are moved toward their original positions under the force of the secondary piston return spring 74 and the fluid pressures. The primary piston return spring 62 applies inward force against the annular guide flange 56 on the perimeter of the cylindrical guide sleeve 46, which in turn, bears against the secondary piston 30. The maximum extension of the primary piston return spring 62 is limited when the stop ring 68 engages the cylindrical enlarged section 48. As the pistons rapidly return to their rest positions, a partial vacuum is created in primary and secondary cylinders 28 and 36. The partial vacuum is communicated through primary and secondary fluid channels 96, 96a to the primary and secondary compensator valves 20, 20a. The resulting pressure differential across the resilient compensator cups 124, 124a causes their flexible lips to be drawn downward. Brake fluid is thus drawn from the reservoirs 22, 22a through the fluid entry holes 140, 140a and thence through the fluid channels 96, 96a into the respective cylinders. This brake fluid drawn into the cylinders makes up any which may be required. It now becomes necessary to release any excess brake fluid thus drawn into the cylinders in order to prevent fluid lock.

When the primary piston 24 returns fully to its rest position, it pulls the annular guide flange 56 into contact with the primary cylinder compensator actuating lever 94. Clockwise rotation of the primary cylinder compensator actuating lever 94 pulls the compensator stem 144 downward until the port hole 148 is drawn below of the resilient material of the compensator cup 124. A fluid channel is thus established between the primary reservoir 22, through the axial blind hole 146, port hole 148 and the fluid channel 96 through which pressure-compensating brake fluid can flow.

The operation of the secondary cylinder compensator valve 20a is the same as described in the preceding.

MALFUNCTION MODES OF OPERATION

The acceptability of a tandem master cylinder comes about because it provides for continued operation of one brake system substantially independently of failure in the other system. The following paragraphs detail the means whereby continued operation is enabled. The mechanisms involved are identical to those described in connection with the normal operation.

All of the failures in the following description are assumed to have caused complete loss of brake fluid pressure in the defective portion of the master cylinder. Such a loss could occur due to an open brake line or cylinder external to the master cylinder, depleted brake fluid, or master cylinder piston failure.

Figure 6:
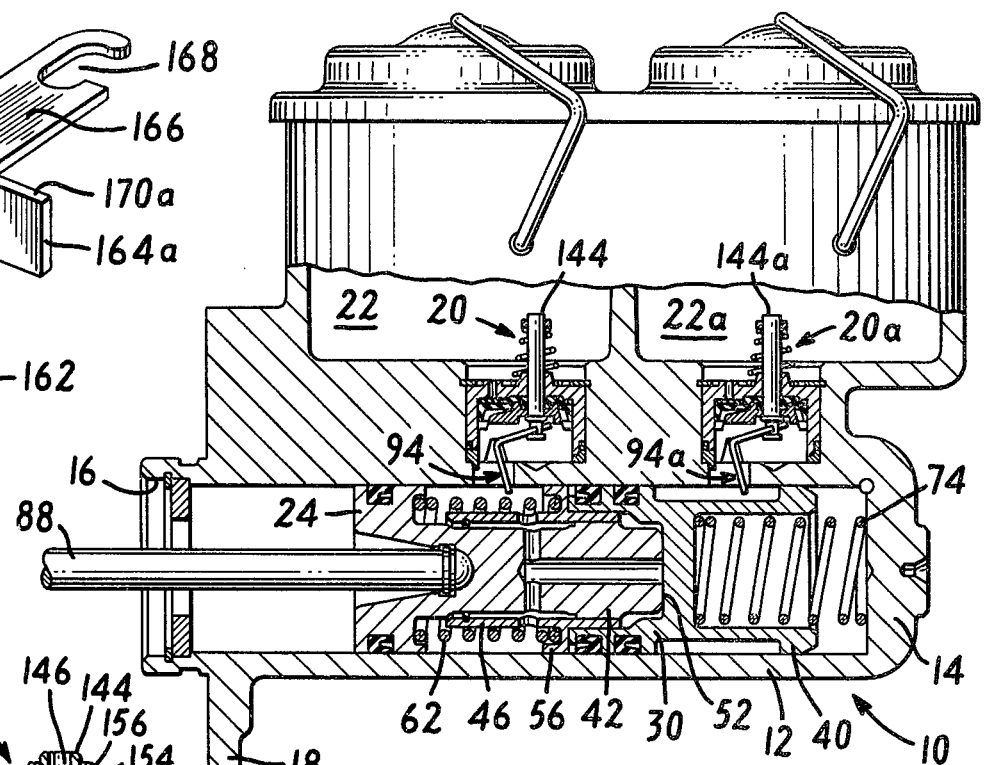
FIG. 6 shows a cross-sectional view of the embodiment of FIG. 1 in which a failure has occurred in the primary brake system.

(a) Failed Primary Brake System. The result of failure in the primary brake system is shown in FIG. 6. Upon initial movement of the pushrod 88, the primary and secondary pistons 24 and 30 begin to move together due to the relative spring forces of return springs 62 and 74 as previously explained. Almost immediately the two compensator actuating levers 94 and 94a are released by their respective flanges 56 and 40. The compensator valves 20 and 20a thereafter provide a seal against positive pressure from the master cylinder. The secondary piston 30 quickly encounters resisting fluid pressure from its functioning brake system. The primary piston 24, not meeting resisting fluid pressure, continues to move under the urging of the pushrod 88. The guide rod 42 telescopes into the cylindrical guide sleeve 46 until the inner end of the guide rod 52 meets the secondary piston 30. Fluid pressure equalization between the primary cylinder 28 and the cylindrical cavity 44 is maintained by open fluid communication through axial hole 50 and transverse hole 54. Thereafter, direct mechanical force on the secondary piston 30, transmitted through the passive primary piston 24 and guide rod 42, provides operation of the secondary brake system.

Figure 7:
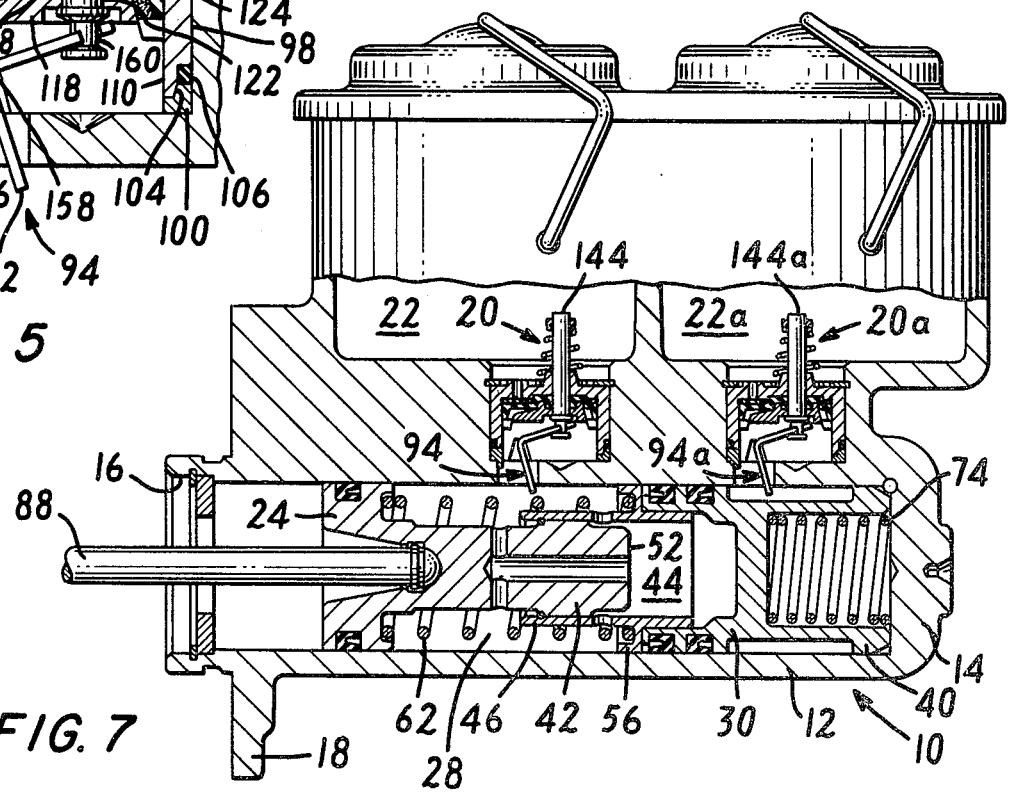
FIG. 7 shows a cross-sectional view of the embodiment of FIG. 1 in which a failure has occurred in the secondary brake system.

(b) Failed Secondary Brake System. The result of failure in the secondary brake system is shown in FIG. 7. Lacking resisting secondary brake system fluid pressure, the secondary piston 30 continues to move into the cylinder until the end of the guide flange 40 contacts the closed end of the cylindrical part 12. The secondary piston 30 thereupon stops moving and allows brake pressure to develop within the primary cylinder 28 for transmission to the primary brake system.

ALTERNATE EMBODIMENT

Figure 8:
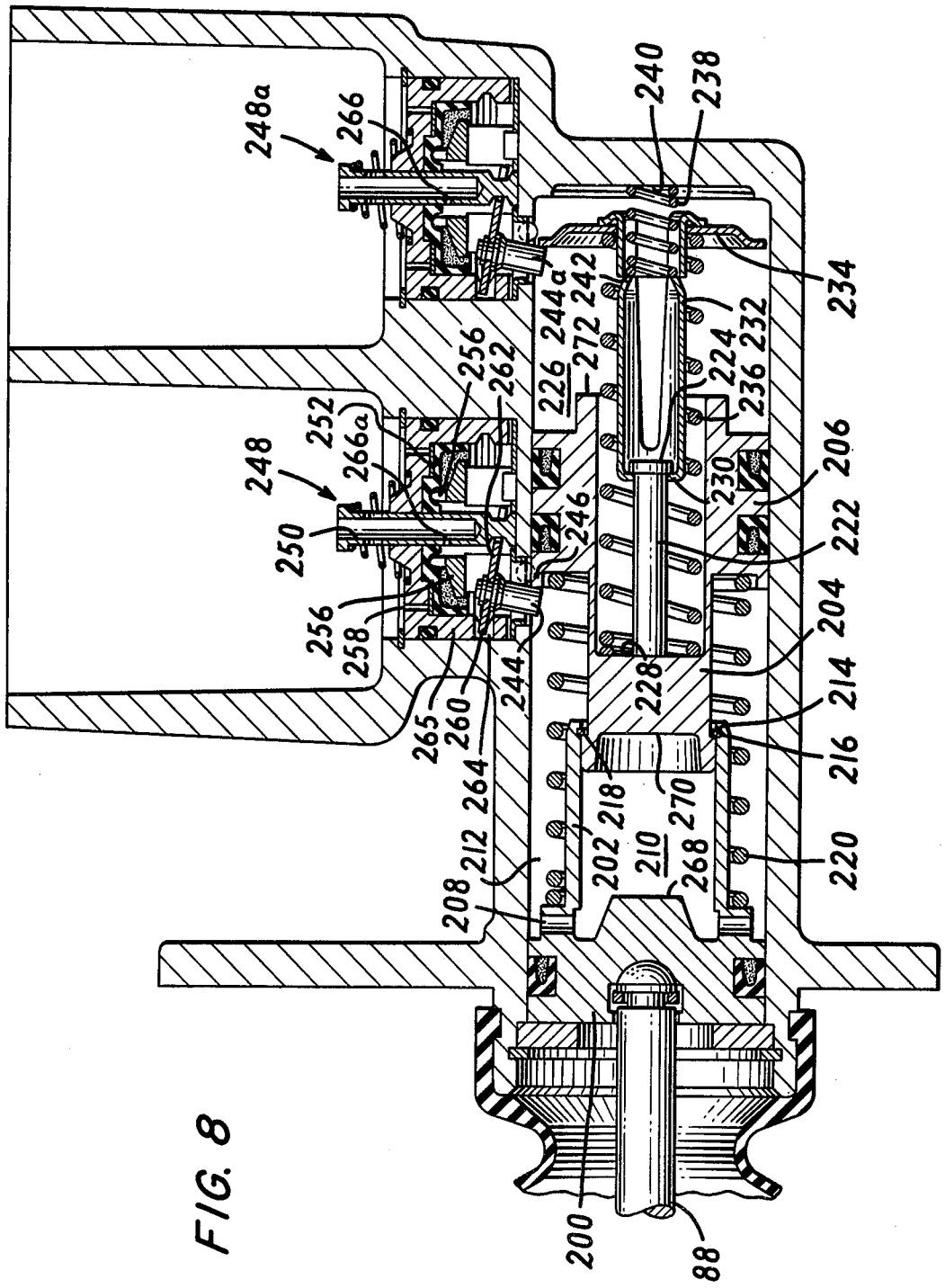
FIG. 8 shows an alternate embodiment of the invention.

An alternative configuration of the tandem master brake cylinder is shown in FIG. 8. Due to the similarity of operation of the alternative configuration to the configuration previously described, only those items which are different will be described in detail.

The primary piston 200 has a guide cylinder 202 attached to its forward face. The outer end of the guide cylinder 202 encircles and slideably engages a cylindrical projection 204 on the rear of the secondary piston 206. A plurality of holes 208, providing fluid communication between the cylindrical cavity 210 within the guide cylinder 202 and the outer region 212 of the primary cylinder, prevents fluid lock within the cylindrical cavity 210 upon telescoping of the guide cylinder 202 over the cylindrical projection 204. A spring ring 214, biased outward by its own spring force into a groove 216 in the inner surface of the guide cylinder 202, interferes with a lip 218 on the outer perimeter of the cylindrical projection 204. The interference between the spring ring 214 and the lip 218 establishes the maximum extension of the primary piston return spring 220.

A cylindrical bar 222 having an enlarged head 224 extends axially toward the secondary cylinder 226 from the wall 228 closing the end of the cylindrical projection 204. An annular lip 230, at the end of a hollow crank plate actuator tube 232 is able to slide up the cylindrical bar 222 but is stooped from disengaging the bar by interference with the enlarged head 224. A disc-shaped crank plate 234 is connected to the outer end of the crank plate actuator tube 232. A secondary piston return spring 236 provides axial force between the wall 228 and the crank plate 234. A crank plate return spring 238 provides axial force between the end of the secondary cylinder 240 and a ridge 242 within the cylindrical crank plate actuator tube 232.

A primary and secondary crank 244, 244a protrude into the primary and secondary cylinders through primary and secondary fluid channels 96, 96a respectively. In the brakes-released condition, the primary crank 244 is maintained deflected by pressure from a flange 246 on the rear of the secondary piston 206. Similarly, the secondary crank 244a is maintained deflected by pressure from the crank plate 234.

The primary compensator valve 248 is identical to the secondary compensator valve 248a. Thus, only the primary compensator valve 248 will be described in detail.

The main difference between the compensator valve 248 in this embodiment and the one previously described, is that here, the compensator valve is symmetrical about the compensator stem 250 rather than eccentric. In addition, the leverage to move the compensator stem 250 is developed in a slightly different way.

A circular compensator cup 252 is held against the underside of the top of the compensator body 265 by a concentric circular ridge 255 in a compensator cup filler 256. A plurality of fluid entry holes 258 spaced about a circle concentric with the compensator stem 250 allow the entry of brake fluid during brake release as previously described.

A tip 260 of a compensator crank lever 262 fits into a groove 264 in the side of the compensator body 265. The other end of the compensator crank lever 262 is hingeably connected to the compensator stem 250. When the compensator crank 244 is pressed toward the left by the released brake system, it rotates the attached compensator crank lever 262 in the clockwise direction about its tip 260. This rotation causes the compensator stem 250 to be drawn downward and the port hole 266 to be opened as previously described.

NORMAL OPERATION OF ALTERNATE EMBODIMENT

When brake application is transmitted to the master cylinder by inward motion of the push rod 88, the primary piston 200, secondary piston 206 and crank plate 234 initially move in concert. The two cranks 244 and 244a are released by the initial motion, thereby closing the port holes 266 and 266a. After a short travel, the crank plate 234 is stopped by the end of the secondary cylinder 240. Additional motion of the secondary piston 206 is accommodated by the crank plate actuator tube 232 riding up on the bar 222.

Forward motion of the primary piston 200 toward the secondary piston 206 is accomplished by the telescoping of the guide cylinder 202 over the cylindrical projection 204 on the rear of the secondary piston 206. Fluid pressure within the guide cylinder 202 is relieved through the holes 208 into the outer region 212 of the primary cylinder The remaining normal operation of the alternate embodiment is identical to that previously described.

MALFUNCTION MODES OF ALTERNATE EMBODIMENT (a) Failed Primary Brake System. Pressure failure in the primary brake system enables forward travel of the primary piston 200 until a projection 268 on the face of the primary piston contacts the matching face 270 at the rear of the cylindrical projection 204. Thereafter, direct mechanical operating force is transmitted to the secondary piston 206 to maintain operation of the secondary brake system.

(b) Failed Secondary Brake System. Failure of the secondary brake system allows the secondary piston 206 and crank plate 235 to travel inward. The force on the crank plate 234 by continued motion of the piston 206 causes the crank plate 234 to move until it comes to rest against the closed end 240 of the cylinder. Thereafter, the secondary piston 206, continues to travel until it contacts the crank plate 234. It then stops moving and allows the primary piston 200 to develop and maintain pressure in the primary brake system.

It will be understood that the claims are intended to cover all changes and modifications of the preferred embodiments of the invention, herein chosen for the purpose of illustration which do not constitute departures from the spirit and scope of the invention.

What is claimed is:

1. In a fluid brake tandem master cylinder of the type having a cylinder containing first and second pistons slideably and sealably coaxially disposed therein and defining primary and secondary cylinder regions, first and second brake fluid reservoirs associated respectively with said primary and secondary cylinder regions, resilient diaphragm means covering the top of each of said reservoirs, said resilient diaphragm means sealably separating brake fluid in said reservoirs from air outside said reservoirs, means on said diaphragm means to permit said diaphragm means to be drawn into said reservoirs as brake fluid is depleted, first and second compensating means for permitting the entry of brake fluid from said first and second reservoirs to said cylinder during the return stroke of said first and second pistons and for permitting open communication between said reservoirs and said cylinder when said first and second pistons are in their fully brakes-off position, wherein each of said first and second compensating means comprises:

(a) a fluid channel from said compensating means entering the side wall of said cylinder;
(b) separating means for separating fluid in the associated reservoir from fluid in said channel, said separating means having a first hole therein;
(c) a sliding stem slidingly engaged in said first hole and having a first end in fluid communication with said reservoir and a second end in fluid communication with said channel;
(d) said separating means having a rigid part adjacent said reservoir mating with a resilient part adjacent said channel, said resilient part being in sealing engagement with the sliding stem;
(e) said first hole passing aligned through said rigid and resilient parts;
(f) a flexible lip on said resilient part;
(g) at least a second hole in said rigid part, said at least a second hole facing said flexible lip;
(h) said resilient part sealing said second hole when positive gauge pressure exists in said cylinder and said flexible lip permitting fluid to flow from said reservoir through said channel to said cylinder when a negative gauge pressure exists in said cylinder;
(i) an actuating lever having first and second ends, said first end protruding through said channel into said cylinder;
(j) means for hingeably connecting the second end of said actuating lever to the second end of said sliding stem;
(k) a fulcrum between said first and second ends of said actuating lever;
(l) means moving with said first and second pistons for engaging and displacing said first end of their associated actuating levers when said pistons are moved to their fully brakes-off position;
(m) said displacing being operative to pull said valve stem from a first to a second position;
(n) displacement of said first end of the actuating lever by said moving means causing sliding movement of said stem in said first hole between first and second fixed predetermined positions;
(o) resilient means biased between said rigid part and said sliding stem for urging said sliding stem toward its first position;
(p) a third hole in said stem having first and second openings; and
(q) said first and second openings bypassing said separating means and providing open fluid communication through said third hole between said reservoir and said channel in the second position of said stem and said resilient part blocking said first opening in the first position of said stem and cutting off fluid communication through said third hole.

2. The master cylinder recited in claim 1 further comprising said second position of said valve stem being toward said cylinder and said first position of said valve stem being toward said reservoir.

* * * * *